Oct. 20, 1959 G. D. JONES 2,909,508
COPOLYMERS OF ACRYLAMIDE AND VINYL AROMATIC SULFONATES
Filed March 12, 1956

INVENTOR.
Giffin D. Jones
BY
Griswold & Burdick
ATTORNEYS

United States Patent Office 2,909,508
Patented Oct. 20, 1959

2,909,508

COPOLYMERS OF ACRYLAMIDE AND VINYL AROMATIC SULFONATES

Giffin D. Jones, Midland, Mich., assignor to The Dow Chemical Company, Midland, Mich., a corporation of Delaware Application March 12, 1956, Serial No. 570,810

11 Claims. (Cl. 260—79.3)

This invention relates to the copolymerization of acrylamide with sulfonated vinyl aromatic compounds. It pertains especially to the copolymers resulting therefrom and their use as flocculants. The term sulfonated vinyl compounds used herein includes the sulfonic acids and salts thereof.

It is known to copolymerize certain sulfonic acid compounds containing the ethylenic group with an N,N'-alkylene-diacrylamide to make insoluble ion-exchange resins.

An object of the invention is to provide water-soluble copolymers of acrylamide and one or more nuclear sulfonated monovinyl aromatic compounds. Another object is to provide a method of making such copolymers. Still another object is to provide water-soluble copolymers which have flocculating properties when added to aqueous solutions containing finely-divided mineral or inorganic substances in suspension. Other and related objects may appear from the following description of the invention.

According to the invention, acrylamide can readily be copolymerized with monovinylsulfonic acids and sulfonates of mononuclear aromatic compounds as hereinafter described, to make novel water-soluble copolymers. I have found the copolymers thus made to be excellent flocculating agents for finely-divided solid materials when added to water or aqueous solutions containing such finely-divided materials suspended therein.

Figure 1:
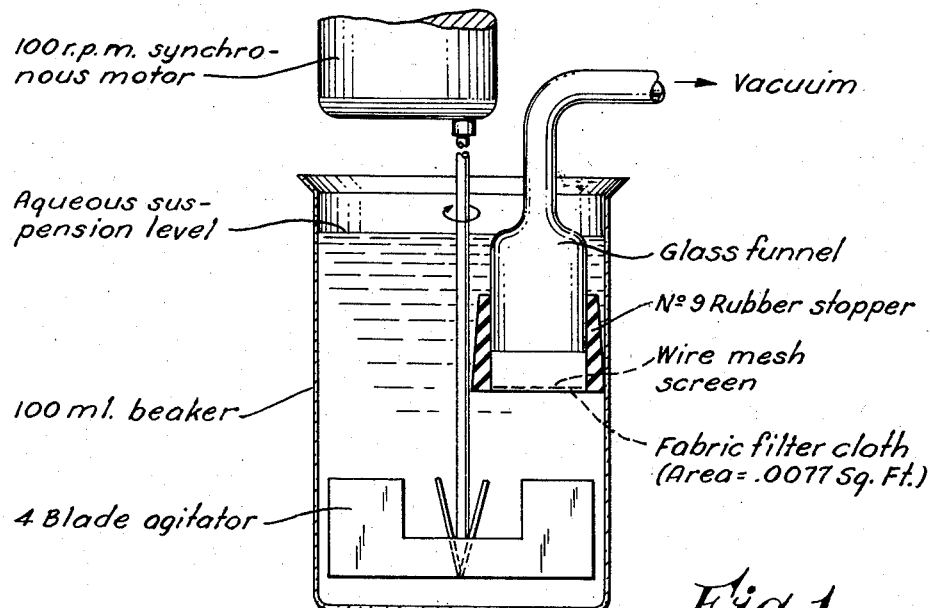
Fig. 1 is an elevational view of the apparatus used to determine the effect of additions of solutions of the copolymer and additions of polyacrylamide to aqueous mineral suspensions.

The sulfonic acids which may be employed in making the copolymer are vinylbenzylsulfonic acid and monovinylbenzenesulfonic acid (styrenesulfonic acid). The sulfonates which may be employed are copolymerizable alkali and alkaline earth salts of monovinylbenzenesulfonic acid, such as the sodium, potassium, ammonium, calcium and magnesium salts, and alkylated derivatives of monovinylbenzenesulfonic acid.

It is preferred that the alkyl radicals directly attached to the nucleus be limited to 2 lower alkyl radicals, each containing from 1 to 3 carbon atoms.

Although vinyl aromatic sulfonic acids may be used as monomers in practicing the invention, I much prefer to use the alkali and alkaline earth salts of the acids because the acids are less stable than the salts and tend to homopolymerize in storage. Moreover, if a copolymer which contains the hydrogen atoms rather than alkali or alkaline earth atoms is desired, the alkali or alkaline earth atoms may be replaced by hydrogen by passing a solution of the polymer through cation exchange resins.

The preferred examples of the suitable sulfonated vinyl aromatic compounds to be employed in making the copolymer are the sodium salt of vinylbenzylsulfonic acid, vinylbenzenesulfonic acid, vinyltoluenesulfonic acid, vinylethylbenzenesulfonic acid, vinylisopropylbenzenesulfonic acid and vinylxylenesulfonic acid.

The copolymers are prepared by polymerizing a mixture of the monomers in the proportion of from 1 to 10 gram molecular weights of one or more of the aforementioned salts of the sulfonated vinyl aromatic compounds and from 99 to 90 gram molecular weights of acrylamide in a solvent for the monomers.

Water is the preferred solvent, although the polymerization can be carried out in aqueous solutions of water-miscible lower aliphatic alcohols such as aqueous solutions of methyl alcohol, ethyl alcohol or isopropyl alcohol containing 50 percent or more by weight of water.

The polymerization can be carried out at a temperature between 0° and 100° C., but preferably from 40° to 80° C., and at atmospheric or superatmospheric pressure. The polymerization can be carried out in aqueous solutions having a pH value of between 3 and 9, but is usually carried out in an aqueous medium having a pH value between 4 and 6.5. Polymerization of the monomers in aqueous solutions at a pH value of 9 or higher tends to promote hydrolysis of the acrylamide to form acrylic acid, and in aqueous solutions having a pH value of 2.5 or lower, imidization of the acrylamide occurs.

Imidization leads to the formation of a crosslinked relatively insoluble product. U.S. Patents 2,486,190, -191, and -192 to Minsk et al. describe the meaning of imidization.

The polymerization reaction is catalyzed by usual free-radical polymerization catalysts which are soluble in the reaction medium. Since water is the usual solvent reaction medium, the catalysts are preferably water-soluble ones. Among suitable catalysts are sodium persulfate, potassium persulfate, ammonium persulfate, hydrogen peroxide, tertiarybutyl-hydroperoxide, etc., or ultraviolet light or irradiaton consisting of X-rays, gamma rays and high energy electrons such as are produced by a Van der Graaff particle accelerator or by cobalt "60."

The polymer is recovered in the usual ways. When carried out in an aqueous solution, water being the preferred solvent, the product is usually obtained in the form of a viscous to gel-like solution of the same in the solvent. The polymer can be recovered by evaporating the solvent, preferably at a subatmospheric pressure, or by pouring the solution into a water-miscible solvent, e.g. a lower aliphatic alcohol, in which the polymer is insoluble, to precipitate the polymer after which the polymer is separated, washed and dried.

High molecular weight is a characteristic of good flocculating agents. The copolymer made according to the invention has an average molecular weight of at least 500,000 and usually well over 1,000,000. The molecular weight of the copolymer varies with the relative proportions of the monomers used and with changes in the polymerization conditions employed. The molecular weight is calculated from the viscosity; the higher the viscosity, the higher is the molecular weight. The viscosity of the copolymer is determined by preparing a 0.5 percent solution thereof in a 2 percent aqueous solution of sodium chloride having a pH value of 3 to 3.5, according to the method taught by P. M. Fuoss in J. Polym. Sci. 3, 602–3 (1948) and further discussed by him in Annals New York Acad. of Sci. 51, 836–51 (1949). The ionic effect of the sulfonate group is suppressed so that a correlation between molecular weight and viscosity can be obtained which is comparable to non-ionic groups. The viscosity of such a solution, as determined by an Ostwald viscosimeter, is at least 2.5 centipoises. It has been shown by Scholtan in Makromol Chem. 15, 169 (1954) that numerical values of the intrinsic viscosity of acrylamide polymers within the range of 2 to 5 coincides rather closely with the viscosity in centipoises. For example, a viscosity of 2½ centipoises under the conditions specified above, is very close to an intrinsic viscosity of 2½ which corresponds to a molecular weight of 500,000; a viscosity of 4 centipoises is equal to an intrinsic viscosity of 3.7 which corresponds to an acrylamide polymer of a molecular weight of 1,000,000. From the viscosity values of the copolymer of the invention, it can readily be seen that unusually high molecular weight copolymers are made.

As has been stated, and as will be illustrated by Examples 6, 7 and 8, the copolymer made by the polymerization described is a highly effective flocculant or flocculating agent when added to water or aqueous solutions containing suspended material according to the procedure described hereinafter.

By flocculant or flocculating agent is meant an additament to a liquid containing suspended material, particularly material in the form of mineral particles, which effectively aids sedimentation or flocculation of the suspended material. This phenomenon is not fully understood, but it is thought that the flocculant causes the small particles to agglomerate into larger particles of more uniform size. The flocculant appears to grasp the smaller particles of suspended material of various sizes and to draw these particles into larger agglomerates. Although the separation of flocculated material from the liquid is often effected by decantation alone, more often separation on a commercial scale is effected by filtration or by a process involving both decantation and filtration. Therefore, to meet the requirement of a good flocculating agent, it must permit reasonably rapid filtration of the treated suspension.

The expeditious and effective removal of suspended material from water or from aqueous solutions forms an essential step in many plant operations. Examples of such operations are found in pumping, filtering and treating of water in domestic, factory, steam-generating, and power systems; in mining and metallurgical processes; and in waste and sewage disposal plants. In the coal industry, the recovery of suspended coal dust following washing operations, prior to compression into nuggets, is of much importance.

Certain manufacturing processes, such as the production of Portland and aluminous cements, and mining operations frequently require the crushing of agglomerated mineral material, slurrying the resulting powder and subsequent separation of the suspended material in the liquid. One convenient means for separation which is used consists essentially of an arcuate trough which circumscribes the lowest arc of a rotating cylindrical filter through which the liquid is drawn and carried away, substantially free from the flocculated solid material. An example of such a filter apparatus which is available commercially is the Oliver rotary filter. Two photographs of rotating filters, of the type to which reference is made herein and which are used for uranium extraction in South African gold recovery plants, are shown in Chem. and Eng. News 32, 1364 (1954). Consideration of efficient operation of such a filter compels the appreciation of the need for a flocculant which produces a floc which not only does not retard the filtration process but facilitates it. I have found that the floc produced by the novel copolymer herein described increases the filterability of a slurry or suspension treated by it.

Sedimentation and filtration of aqueous suspensions have been accompanied by a number of difficulties. Many of the slurries are best described as slimes in which the suspended material settles only after very long and costly waiting periods. It often redisperses upon very slight agitation such as unavoidably develops when attempting to separate the liquid phase from the concentrated slurry phase. Other suspended materials are reluctant to be separated by filtration because of their pronounced tendency to form an almost impervious slimy film on the filtering membrane. Further difficulties are encountered in washing certain separated solids because the solid particles remain coalesced during the attempted washing operation.

The need for flocculating agents has long been realized. Natural substances such as animal glues, vegetable gums, and starches have been employed with moderate success. The limited pH range in which such agents may be used, the criticality of the amounts that may be added to the suspensions, difficulties encountered in storage due to spoilage, and the accompanying variations from specifications due to changes during storage are definite disadvantages to their use and prevent their wide acceptance.

In copending patent application Ser. No. 438,612, filed June 22, 1954, and assigned to the common assignee of the instant application, the use of high molecular weight polyacrylamide as an additament to an aqueous medium as an effective water-soluble aid to the concentration of and the subsequent separation of suspended solids from such aqueous medium is described. Such an additament offers the advantages of being reproducible and therefore having initially uniform properties, of being less subject to deterioration through oxidation and bacterial action, of being operable over a wide range of pH values and of requiring relatively small amounts to be added but on the other hand permitting a wide tolerance in the amount added without lessening the effectiveness.

Although polyacrylamide has proved itself to be a flocculant of exceptionally high effectiveness, there is an area of use in which there is need for a flocculant which has a delayed or less stringent action. That area may be defined as existing where a concentration of 0.15 gram to 5 grams of flocculant per liter of water in the treating solution is required. Such a requirement exists when dilution of the clarified liquid, from which the suspended material has been removed, is undesirable. Illustrative of such undesirable dilutions are operations in which the clarified liquid must be further processed, for example in mining operations, where any appreciable increase in the bulk of solutions of metal-bearing compounds which must undergo further treatment, ultimately to separate the metals, is costly and time-consuming.

Copolymers of acrylamide containing up to 10 mole percent of a sulfonic acid of the monovinyl aromatic hydrocarbons of the benzene series or of the alkali or water-soluble alkaline earth salts or of the alkyl derivatives of such sulfonic acids offer valuable advantages as flocculants, over even the homopolymer of acrylamide.

I have found that a solution of a copolymer made according to my invention and dissolved in water in concentrations between 0.15 and 5.0 grams per liter (about .015% and about 0.5% by weight) may be added to aqueous suspensions in amounts between 0.075 to 0.20 pound per ton of suspended material with highly gratifying results on the rate of flocculation and the rate of subsequent separation by filtration.

The method employed for treating an aqueous suspension will vary somewhat, dependent upon such conditions as size of suspended particles, further processing of either solids or the clarified liquid, upon what facilities are available, and upon the extensiveness of the overall operation concerned.

The copolymer flocculant may be added to a body of water or aqueous solution containing suspended inorganic material, while gently stirring the body according to copending application Serial No. 438,614, filed June 22, 1954, assigned to the common assignee of the instant application. The water or aqueous solution is allowed to stand relatively undisturbed for a period sufficiently long to permit concentration of the flocculated solid into a substratum. Thereafter, the clearer liquid above the substratum of concentrated flocculated solids is decanted or otherwise removed.

A method which works well is to employ a feeder head to introduce the copolymer in aqueous solution into the main transfer line through which the suspension is being transferred to a settling bed preparatory to decantation, filtration or centrifugation.

The practice of the invention will be made clear by the following examples which are illustrative only and not intended to be limitations on the practice of the invention.

EXAMPLE 1

For copolymerization with acrylamide, the monomer, sodium vinylbenzylsulfonate (which may also be named sodium vinyltoluene-alpha-sulfonate), was prepared by treating a solution consisting of 63 grams of sodium sulfite in 200 grams of water with 70 grams of 91.5 percent pure vinyl-benzyl chloride, portionwise, while agitating, over a period of 15 hours at room temperature. The vinylbenzyl chloride used was principally para-vinylbenzyl chloride; there was present also, however, a lesser proportion of ortho and meta isomers. Unreacted vinylbenzyl chloride together with certain vinylbenzyl chloride derivatives was extracted with benzene. Upon chilling the solution to between 10° C. and 0° C., the product, sodium vinylbenzylsulfonate, crystallized out together with some of the sodium chloride formed and with some sodium sulfite which remained unreacted. The crystals only contained a part of the sodium chloride formed, because the latter is more soluble than the sulfonate monomer. By the iodine number method of analysis of the water-soluble crystals containing the unsaturated vinyl group the percentage of sodium vinylbenzylsulfonate thereof was found to be 76.9%. The presence of some sodium chloride in the crystals did not interfere with subsequent polymerization in water solution. The sodium sulfite present acted as an activator for the acrylamide peroxide which is commonly present. The acrylamide used in this example had analyzed 5 to 7 parts per million of acrylamide peroxide in the acrylamide monomer; acrylamide peroxide is a water-soluble free-radical promoting catalyst.

The copolymerization of the acrylamide and sodium vinylbenzylsulfonate was carried out as follows: A solution of 9.5 grams of acrylamide and 0.65 gram of the sodium vinylbenzylsulfonate, 76.9 percent purity which was prepared as shown, and 40 grams of water was placed in a glass-walled ampoule. The pH was adjusted to 5 with hydrochloric acid and the ampoule sealed. No catalyst was added since the presence of the sodium sulfite and acrylamide peroxide was sufficient to make the reaction go. The polymerization was carried out at room temperature for 15 hours. The copolymer formed was precipitated by methanol and removed by filtration. On the basis of a sulfur determination, the copolymer showed a weight percent of sodium vinylbenzylsulfonate of 3.25 percent by weight which is a mole percent of 1.07. The copolymer formed, therefore, consisted of 1.07 mole percent of the sulfonate and 98.93 mole percent of acrylamide.

The viscosity of the polymer formed was ascertained to be 3.12 centipoises by dissolving sufficient polymer in a 2 percent sodium chloride solution to make a 0.5 percent solution of the polymer.

Higher yields are usually obtained, however, by an addition of a water-soluble catalyst such as potassium or sodium persulfate. Nitrogen or other inert gas may be used to remove the oxygen gas in the monomeric mix since it has been found that oxygen inhibits the polymerization until it has been used up by reacting with the mix, perhaps in the formation of a peroxide.

EXAMPLE 2

A solution consisting of 0.5 gram of sodium vinylbenzenesulfonate, 9.5 grams of acrylamide, and 0.045 gram of potassium persulfate in 90 ml. of water was adjusted to a pH of 5 with concentrated hydrochloric acid. The solution was purged of undesirable dissolved gases such as oxygen by bubbling pre-purified nitrogen through it for 15 minutes. It was then copolymerized for 20.5 hours at 60° C. The copolymer formed was precipitated with methanol and dried, yielding 10 grams of product. The product contained 0.82 percent sulfur by weight. This corresponds to 5.27 weight percent sodium vinylbenzenesulfonate in the copolymer. The mole percent of sulfonate was about 1.9 and the acrylamide was about 98.1 mole percent. The viscosity of a 0.5 percent aqueous solution of the polymer in a 2 percent sodium chloride aqueous solution at a pH of 3 was 4.77 centipoises.

EXAMPLE 3

An aqueous solution (225 ml.) of a 10 weight percent acrylamide, 0.5 percent disodium monohydrogen phosphate, 0.5 percent sodium dihydrogen phosphate, 0.01 percent potassium persulfate (a free-radical water-soluble polymerization catalyst) having a pH of 6.5 were added to 25 ml. of a 10 percent aqueous solution of sodium vinylbenzenesulfonate which also had a pH of 6.5. Pre-purified nitrogen was bubbled through the solution for 15 minutes; the solution was thereafter copolymerized at 60° C. for 15 hours. The sodium hydrogen phosphates act as a buffer by controlling the pH which tends to drop, likely due to the formation of sulfuric acid by the persulfate catalyst. The copolymer formed was precipitated by a mixture of lower alkyl alcohols; it was then dried. Analysis of the polymer showed 2.72 percent sulfur which corresponds to a weight percent of the sodium vinylbenzenesulfonate of 17.42 percent of the copolymer. The mole percent of the sodium vinylbenzenesulfonate in the copolymer was 6.8 percent and that of the acrylamide 93.2 percent. A 0.5 percent solution of the copolymer in water was placed in a 2 percent sodium chloride solution having a pH of 3, as in Examples 1 and 2, and the viscosity found to be 3.97 centipoises.

EXAMPLE 4

A 200 ml. aqueous solution of 10 percent acrylamide monomer, 0.5 percent disodium monohydrogen phosphate and 0.5 percent sodium dihydrogen phosphate and 0.01 percent potassium persulfate which had a pH of 6.5, was admixed with 15 ml. of a 10 percent aqueous sodium vinylbenzenesulfonate which also had a pH of 6.5. Pre-purified nitrogen was bubbled through the resulting monomeric mix for 10 minutes. The mix was then polymerized for 15 hours at 80° C. A copolymer was formed which was precipitated in methanol and dried; 27.5 grams of the copolymer were recovered. The weight percent of the sodium vinylbenzenesulfonate in the copolymer was 15.1 percent, i.e. the copolymer contained a mole ratio of 5.8 of the sulfonate to 94.2 mole of the acrylamide. The viscosity of a 0.5 percent aqueous solution of the copolymer in a 2 percent sodium chloride aqueous solution was 2.23 centipoises, as determined as in the previous examples.

EXAMPLE 5

A solution of 237.5 ml. containing 10 percent acrylamide, 0.5 percent disodium monohydrogen phosphate, 0.5 percent sodium dihydrogen phosphate, and 0.01 percent potassium persulfate, the solution having a pH of 6.5, was added to 12.5 ml. of a 10 percent aqueous solution of sodium vinylbenzylsulfonate at a pH of 6.5. The resulting mixed solution was bubbled with nitrogen for 10 minutes and thereafter polymerized at 60° C. After 15 hours the polymerization was complete. Analysis showed the copolymer to contain 4.05 percent by weight of the chemically combined sulfonate; the mole percent of the sulfonate was therefore 1.5 and the mole percent of the acrylamide 98.5. The viscosity of a 0.5 percent aqueous solution of the copolymer in a 2 percent aqueous sodium chloride was 6.91 centipoises.

EXAMPLE 6

A copolymer which analyzed 5 percent sodium vinylbenzenesulfonate and 95 percent acrylamide, made according to Example 2, and polyacrylamide homopolymer, which is known to have superior flocculating properties to other previously known flocculants, were individually evaluated and contrasted as flocculants using the apparatus shown in Figure 1.

A slurry of acid-leached South African uranium ore consisting of 60% suspended mineral solids and 40% water, having a pH of 1.9, was filtered by means of the filtering apparatus of Fig. 1. Varying concentrations of aqueous solutions of polyacrylamide and of the copolymer made according to Example 2 of the invention were separately bled into the line carrying the slurry to the filter trough and evaluated; the total flocculant added, regardless of the concentration of the flocculant solution was, in all cases 0.1 pound of flocculant per ton of suspended material.

The apparatus of Figure 1 simulates continuous filter operations which use a rotary filter described hereinbefore. In using the apparatus adapted, as shown in Figure 1, the leaf, which is attached to an exhaust means, for creating a partial vacuum which was previously adjusted, is inserted in the slurry after either 1 minute or 5 minutes of timed agitation for a period of 15 seconds. The leaf containing the cake, and while the vacuum was still applied, was removed and dried. Thereafter it was washed and redried; the vacuum was shut off and a small positive pressure applied to the cake to slightly loosen it. The filtered cake was then removed from the leaf and its weight determined. The filtration rate was then determined.

In a commercial continuous filter, the rotating filter is submerged in the slurry being filtered only a fraction of the time of each rotation. A forty-five second cycle or rotation time, with a depth of slurry sufficient to cause any given area of the filter to be submerged about one-third of the time of each rotation, are common conditions of operation. Those conditions, were, therefore, chosen as typifying commercial operation.

At such an r.p.m. and slurry depth as selected in the example, any given area of a rotating filter at this r.p.m., and passing through this depth of slurry, is fully submerged only one-third of the time of a complete cycle. The per diem values set out in Table I under filtration rate are calculated from 15 second periods of submersion of the leaf of Fig. 1 and are considered to be 1/3 of the cycle time.

Therefore, the per diem pound per square foot filtration rate was found by multiplying the weight of cake per square foot accumulating in one cycle (although only being submerged one-third of the time of that cycle) by the number of cycle periods in 24 hours. Since 15 seconds equals one-third of the cycle, then a full cycle time is 45 seconds. The filtration rate in pounds/square foot/day is therefore $$\frac{86{,}400 \text{ (number of seconds in 24 hours)}}{45}$$

times the pounds deposited on a given square foot of the filter screen per cycle.

Best results were obtained when the agitation was maintained at a minimum for uniform mixture. The agitator here was operated at 100 r.p.m. The polymer which was most effective had a viscosity of 4 or more centipoises which corresponds to a molecular weight of 1,000,000 or over.

The results are set out in Table 1.

Table 1

| Agent | Agent Concentration, gm./liter | Treatment Level, lb./ton | Filtration Rate, lb./ft.² day | |
|---|---|---|---|---|
| | | | After 1 min. | After 5 min. |
| Polyacrylamide | 0.4 | 0.075 | 3,000 | 2,810 |
| Do | 0.4 | 0.10 | 3,580 | 3,150 |
| Copolymer | 0.4 | 0.075 | 4,230 | 3,410 |
| Do | 0.4 | 0.10 | 5,010 | 4,000 |
| Blank | | | 1,040 | |

Solutions of polyacrylamide over a wide range of concentrations, including the range covered in Table 1, have been shown in copending application 438,612 to be an excellent flocculant. However, the results in Table 1 show that at concentrations of 0.4 gram per liter, which is roughly 0.04 gram per 100 grams or 0.04 percent, the copolymer was clearly superior to the homopolymer polyacrylamide. At lower concentrations the polyacrylamide (not shown herein) was found superior. There are occasions in which concentrations of 0.04 percent flocculant solutions or greater are desirable because of the ensuing dilution of the treated dispersions which invariably results when substantially lower concentrations are added.

Figure 2:
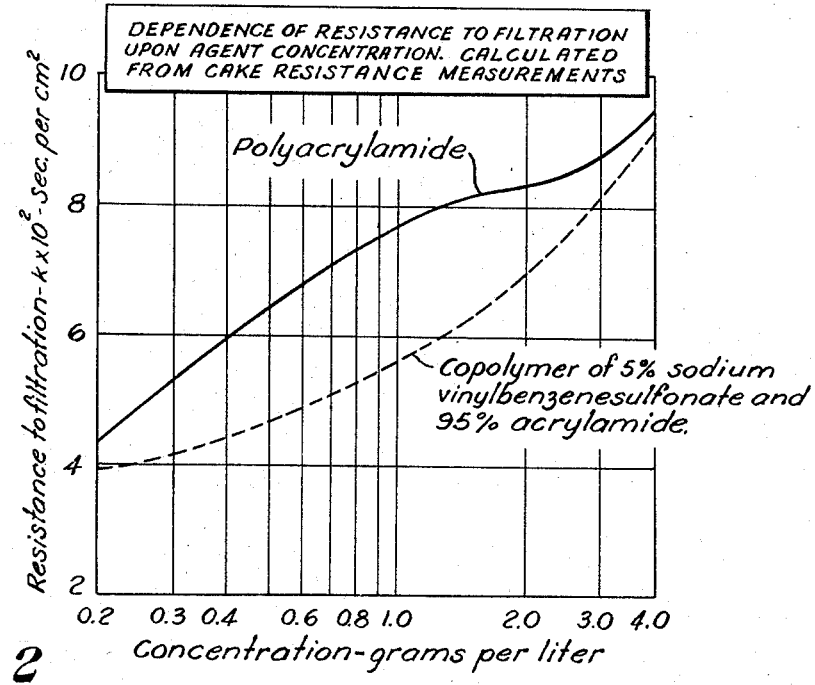
Fig. 2 is a graphic showing of the contrasting effect of additions of aqueous solutions of varying concentrations of the copolymer and of polyacrylamide to aqueous mineral suspensions.

Figure 2 graphically shows the superiority of the copolymer, composed of 5 mole percent sodium vinylbenzenesulfonate, made according to Example 2, and 95 mole percent of acrylamide as a flocculant, over polyacrylamide (a very good flocculant itself at these concentrations).

The horizontal coordinate of Fig. 2 is the concentration of flocculant solution in grams per liter (the total weight of flocculant to weight of suspended matter remaining constant); the vertical coordinate shows the resistance to filtration based upon the constant $k'$, calculated from cake resistant measurements. The constant $k'$ is determined as follows:

$$k' = \frac{1}{p}\left(\frac{1}{s_1} - \frac{1}{s_2}\right)k$$

where $p$ equals density of filtrate in grams per cc., $s_1$ equals weight of solids in the treated slurry in grams, $s_2$ equals weight of solids in a filtrate-saturated filter cake in grams, $k$ equals a constant determined by the following equation:

$$k = \frac{\dfrac{t}{v} - c}{g}$$

where $t$ is time required to pass a volume $v$ of filtrate through a cake containing a weight $g$ of dry solids deposited on the filter which requires $c$ time for $v$ volume filtrate to pass through the filter alone. Gram-centimeter-second units are used. The quantity $k$, therefore, is obtained by noting the seconds necessary to pass a measured volume in cc. of filtrate through a cake containing $g$ grams of dry solids deposited by the filtration of slurry which has been treated in the desired way; $k'$ is then a measure of the resistance of the slurry to filtration when deposited on the same filter used to determine $k$.

EXAMPLE 7

A second filtration was conducted using the apparatus shown in Figure 1 following generally the procedure which was used in Example 6, employing the additives (the copolymer made according to Example 1 and polyacrylamide) in concentration of 0.4 gram per liter and in total amounts as stated in Table 2.

In this example, another sample of acid-leached South African uranium ore was made into a 50 percent slurry having a pH of 1.6. The apparatus shown in Figure 1 was used to ascertain filtration rates. Cake samples were taken by submerging the leaf for 15 second periods immediately following 1 minute and 5 minutes of agitation. The values obtained are calculated as the pounds per square foot per day of a rotating cylindrical suction filter which requires 45 seconds for one cycle, or three times the 15 second submersion time.

Results of this example are set forth in Table 2.

Table 2

EVALUATION OF EFFICIENCY OF FLOCCULANTS IN FILTRATION OF AFRICAN ORE

| Agent | Lbs. per Ton | Percent solids in cake | | Filtration Rate, lbs./sq. ft./day | |
|---|---|---|---|---|---|
| | | 1 min. | 5 min. | 1 min. | 5 min. |
| Blank | | 74.6 | 73.8 | 604 | 503 |
| Polyacrylamide, 9.4 cps | .05 | 78.6 | 77.2 | 2,165 | 1,915 |
| | .075 | 80.0 | 79.5 | 3,650 | 3,197 |
| 95% acrylamide and 5% sodium p-vinylbenzyl sulfonate copolymer | .05 | 80.4 | 81.7 | 4,280 | 3,750 |
| | .075 | 79.7 | 82.9 | 5,810 | 4,820 |

EXAMPLE 8

A different sample of a South African ore from those used in Examples 6 and 7 was divided into three portions, two were treated with polyacrylamide homopolymer having different viscosities and the other was treated with the copolymer made according to Example 2. The polymers were added as 0.04 percent solutions to give 0.2 pound of polymer per ton of solids in all runs. The slurry contained 49.5 percent suspended solids at a pH of 1.5. The apparatus shown in Figure 1 was again used to ascertain the effect of the copolymer upon filtration. The leaf was inserted and the cake collected for 15 seconds after 1, 5 and 15 minutes of agitation at 100 r.p.m. Table 3 sets forth the results obtained.

Table 3

EVALUATION OF EFFICIENCY OF FLOCCULANTS IN URANIUM ORE [1]

| Polymer Used | Time of agitating before filtering | | |
|---|---|---|---|
| | 1 min. | 5 min. | 15 min. |
| Polyacrylamide, 8.7 cps | 846 | 617 | 525 |
| Polyacrylamide, 29.4 cps | 621 | 429 | 433 |
| 95% acrylamide and 5% sodium p-vinylbenzene sulfonate, 4.77 cps. copolymer | 1,340 | 790 | 740 |
| Blank | 188 | 188 | 175 |

[1] Data expressed as pounds per day per square foot; pH 1.5; solids 49.5%; den. 1.46 g./cc.; cycle 45 sec.; 0.2 lb. flocculant per ton of solids added as 0.04% solution.

In the foregoing examples, which are illustrative of my invention, it is readily seen that the copolymer, made according to the method shown, is an exceptionally effective flocculant at the concentration of flocculant solution employed, and permits wide tolerance of the amounts added.

Having thus described my invention, what I claim and desire to protect by Letters Patent is:

1. A copolymer of from 99 to 90 mole percent of acrylamide and a total of from 1 to 10 mole percent of at least one monovinyl aromatic sulfonate selected from the class consisting of vinylbenzylsulfonic acid, vinylbenzenesulfonic acid, alkali and alkaline earth metal salts of said acids, and alkylated derivatives of said acids and salts having from 1 to 2 alkyl radicals, each containing from 1 to 3 carbon atoms, attached to the benzene nucleus.

2. The copolymer of claim 1 wherein said copolymer has an instrinsic viscosity of at least 2.

3. The copolymer of claim 1 wherein the said alkali salt of a monovinyl aromatic sulfonic acid is sodium vinylbenzenesulfonate.

4. The copolymer of claim 1 wherein the said alkali salt of a monovinyl aromatic sulfonic acid is sodium vinylbenzylsulfonate.

5. The method of making a copolymer which comprises reacting, at temperatures between 0° and 100° C., an aqueous solution having a pH value of between 3 and 9, of from 99 to 90 mole percent of acrylamide and from 1 to 10 mole percent of at least one monomer selected from the class consisting of vinylbenzylsulfonic acid, vinylbenzenesulfonic acid, alkali and alkaline earth metal salts of said acids and alkylated derivatives of said acids and salts having from 1 to 2 alkyl radicals, each containing from 1 to 3 carbon atoms, attached to the benzene nucleus.

6. The method of making a copolymer which comprises reacting, for a period of from 1 to 40 hours at a temperature between 0° and 100° C., in the presence of a free radical-forming polymerization catalyst an aqueous solution having a pH value of between 3 and 9 and consisting essentially of from between 99 to 90 mole percent of acrylamide and from between 1 to 10 mole percent of at least one monomer selected from the class consisting of vinylbenzylsulfonic acid, vinylbenzenesulfonic acid, alkali and alkaline earth metal salts of said acids, and alkylated derivatives of said acids and salts having from 1 to 2 alkyl radicals, each containing from 1 to 3 carbon atoms, attached to the benzene nucleus and separating said copolymer.

7. The method of claim 6 wherein the copolymer is separated from the mixture by adding a lower aliphatic alcohol to precipitate the copolymer.

8. The method of claim 6 wherein the catalyst is selected from the class consisting of tertiary-butyl-hydroperoxide, potassium persulfate, sodium persulfate, methyl ketone peroxide, and hydrogen peroxide.

9. The method of claim 6 wherein the catalyst is high energy electrons.

10. A composition of matter for adding to existent aqueous suspensions of finely divided mineral particles to aid in the concentration and removal of said particles therefrom consisting of an aqueous solution of from 0.015 percent to 0.5 percent of a copolymer prepared by admixing 99 to 90 mole percent of vinylbenzylsulfonic acid, vinylbenzenesulfonic acid, alkali and alkaline earth metal salts of said acids, and alkylated derivatives of said acids and salts having from 1 to 2 alkyl radicals, each containing from 1 to 3 carbon atoms, attached to the benzene nucleus.

11. The composition of matter of claim 10 wherein the alkali metal salt of a monovinyl aromatic sulfonic acid is the sodium salt.

References Cited in the file of this patent

UNITED STATES PATENTS

| | | |
|---|---|---|
| 2,348,705 | Alderman | May 16, 1944 |
| 2,398,083 | Lintz | Feb. 5, 1946 |
| 2,616,917 | Coover | Nov. 4, 1952 |
| 2,667,469 | Sauer | Jan. 26, 1954 |
| 2,728,724 | Gloor | Dec. 27, 1955 |
| 2,837,500 | Andres et al. | June 3, 1958 |

FOREIGN PATENTS

Wiley et al.: J. Am. Chem. Soc., 76, 720–723 (February 1954).